(12) United States Patent
Markel

(10) Patent No.: US 7,162,697 B2
(45) Date of Patent: Jan. 9, 2007

(54) SYSTEM AND METHOD FOR DISTRIBUTION OF INTERACTIVE CONTENT TO MULTIPLE TARGETED PRESENTATION PLATFORMS

(75) Inventor: Steven O. Markel, Highlands Ranch, CO (US)

(73) Assignee: Intellocity USA, Inc., San Francisco, CA (US)

( * ) Notice: Subject to any disclaimer, the term of this patent is extended or adjusted under 35 U.S.C. 154(b) by 1196 days.

(21) Appl. No.: 09/933,927

(22) Filed: Aug. 21, 2001

(65) Prior Publication Data

US 2002/0088008 A1 Jul. 4, 2002

Related U.S. Application Data

(60) Provisional application No. 60/227,063, filed on Aug. 21, 2000.

(51) Int. Cl.
*G06F 3/00* (2006.01)
*H04N 5/445* (2006.01)

(52) U.S. Cl. ............... 715/717; 715/760; 715/762; 715/500.1; 715/719; 715/718; 715/513; 725/59; 725/105; 725/135

(58) Field of Classification Search ............... 715/717, 715/718, 760, 749, 748, 762, 719, 716, 746, 715/747, 513, 500.1, 512; 725/37, 51, 59, 725/105, 109, 110, 112, 133, 135, 141, 153
See application file for complete search history.

(56) References Cited

U.S. PATENT DOCUMENTS

| | | | |
|---|---|---|---|
| 5,467,288 A | 11/1995 | Fasciano et al. | 364/514 R |
| 5,524,193 A | 6/1996 | Covington et al. | 395/154 |
| 5,583,980 A | 12/1996 | Anderson | 395/173 |
| 5,600,775 A | 2/1997 | King et al. | 395/806 |
| 5,631,903 A | 5/1997 | Dianda et al. | 370/401 |
| 5,655,144 A | 8/1997 | Milne et al. | 395/807 |
| 5,680,639 A | 10/1997 | Milne et al. | 395/806 |
| 5,929,849 A | 7/1999 | Kikinis | 345/327 |
| 5,931,908 A | 8/1999 | Gerba et al. | 709/219 |
| 5,951,639 A | 9/1999 | MacInnis | 709/217 |
| 6,006,241 A | 12/1999 | Purnaveja et al. | 707/512 |
| 6,006,256 A | 12/1999 | Zdepski et al. | 709/217 |
| 6,012,098 A | 1/2000 | Bayeh et al. | 709/246 |

(Continued)

FOREIGN PATENT DOCUMENTS

GB 2327837 2/1999

(Continued)

OTHER PUBLICATIONS

Fernandez Panadero MC et al.: "Mass-customizing electronic journals", *Online!*, May 10, 1999, XP002177409.

(Continued)

*Primary Examiner*—Raymond J. Bayerl
(74) *Attorney, Agent, or Firm*—Morrison & Foerster LLP (57) ABSTRACT

A text based script file describing enhancements is parsed to produce platform dependent enhancement files that may be employed to produce enhancements on a set top box, enhanced television, or computer display. A script file may be of XML format and a parser may be an XSL translator. A parser may import HTML and Javascript from other applications. A parser may support a media player for emulation to view video and enhancements. Trigger data for rendering enhancements may be formatted into a javascript array. Trigger events may be employed to replace graphic pointers or text values. Multiple parsers, each supporting a specific platform, allow a single script file to be employed across multiple platforms. New platforms or versions of platforms are supported through new or updated parsers.

30 Claims, 7 Drawing Sheets

U.S. PATENT DOCUMENTS

| | | | |
|---|---|---|---|
| 6,154,771 A | 11/2000 | Rangan et al. | 709/217 |
| 6,173,317 B1 | 1/2001 | Chaddha et al. | 709/219 |
| 6,201,538 B1* | 3/2001 | Wugofski | 715/716 |
| 6,230,172 B1 | 5/2001 | Purnaveja et al. | 707/512 |
| 6,263,332 B1 | 7/2001 | Nasr et al. | 707/5 |
| 6,476,833 B1 | 11/2002 | Moshfeghi | 345/854 |
| 6,785,902 B1* | 8/2004 | Zigmond et al. | 725/38 |
| 6,938,270 B1* | 8/2005 | Blackketter et al. | 725/112 |
| 2001/0011375 A1 | 8/2001 | Yun | 725/107 |
| 2002/0088011 A1* | 7/2002 | Lamkin et al. | 725/135 X |

FOREIGN PATENT DOCUMENTS

| | | |
|---|---|---|
| JP | 10042271 | 2/1998 |
| JP | 227851 A | 8/2000 |
| WO | WO 99/35832 | 7/1999 |
| WO | WO 00/49520 | 8/2000 |
| WO | WO 01/28235 A1 | 4/2001 |

OTHER PUBLICATIONS

Jose Alvear: "Realnetworks' Realaudio and Realvideo", Web developer.com, guide to streaming multimedia, New York: John Wiley & Sons, U.S, 1998, XP002150113, ISBN:0-471-24822-3.

International Search Report from Ladas & Parry, May 11, 2002.

Chambers, C.S.: "Designing a set-top box operating system", International Conference on Consumer Electronics—*Digest of Technical Papers* Rosemont, Jun. 7-9, 1995, New York, IEEE US vol. CONF. 14, Jun. 7, 1995, pp. 368-369 XP000547858 ISBN 0-7803-2141-3 p. 76, col. 1, paragraph 7.2.1C.

Anonymous, "HTML 4.0 Specification", W3C Recommendation, Apr. 24, 1998, XP002191626, the whole document.

"MPEG-4 Authoring Tools let Pros, Consumers Create Multimedia for Web Pages, TV HDTV", Sarnoff Document, Dec. 10, 1998, XP002155140, the whole document.

Shim Ssy et al: "Template based synchronized multimedia integration language authoring tool", proceedings of the Spie, Spie, Bellingham, VA, US vol. 3964, Jan. 2000, pp. 134-142, XP000986660 the whole document.

PCT International Search Report from Ladas & Parry, Mar. 22, 2002.

Dr. Tech. Petri Vuorimaa et al. "XML Based Text TV," 2000 IEEE, pp. 109-113.

* cited by examiner

SYSTEM AND METHOD FOR DISTRIBUTION OF INTERACTIVE CONTENT TO MULTIPLE TARGETED PRESENTATION PLATFORMS

CROSS REFERENCE TO RELATED APPLICATIONS

This application is based upon and claims priority of U.S. provisional application No. 60/227,063 entitled "A DATA DRIVEN SYSTEM AND METHOD FOR DISTRIBUTION OF INTERACTIVE CONTENT TO MULTIPLE TARGETTED PRESENTATION PLATFORMS", filed Aug. 21, 2000 by Steve O. Markel, the entire disclosure of which is herein specifically incorporated by reference for all that it discloses and teaches.

REFERENCE TO COMPUTER PROGRAM LISTING APPENDIX ON A COMPACT DISC

Two copies of a single compact disc (Compact Disc), labeled Copy 1 and Copy 2, are hereby incorporated by reference in their entirety. Each Compact Disc contains Computer Program Listing Appendices A and B. Computer Program Listing Appendix A (created on Compact Disc on Mar. 20, 2006, and having a size of 482,816 bytes). Computer Program Listing Appendix B (created on Compact Disc on Mar. 20, 2006, and having a size of 57,856 bytes).

BACKGROUND OF THE INVENTION a. Field of the Invention

The present invention relates to interactive and enhanced television and, more particularly, to a method and system that produces enhanced content that may be employed across a plurality of platforms without re-editing.

b. Description of the Background

A television program may be accompanied by additional information employed to enhance the program or to provide viewer interaction. Enhancements have historically included closed captioning and multilingual support. Advances in networking, computer systems, and video production have increased the number and types of enhancements that may be provided with a program or advertisement. Enhancements may include stock updates, news stories, Internet links, weather forecasts, bulletins, statistics, trivia, and other information. For example, a football game may include icons allowing viewing of team players, statistics, trivia and other information such as upcoming games. Further, the advent of set-top-boxes, as may be used in cable and satellite television systems, allows enhancement information to be presented in new ways, such as screen overlays and in windows, for example.

Enhanced television content may employ a combination of HTML (hypertext markup language), JavaScript, Java and other formats common to Internet page display. An enhanced display may comprise text, icons, graphics and images placed at locations on or in proximity to the television image. To produce an enhanced display, an author must create a file identifying each displayed element (such as text, icons, graphics and images), the location where each element is displayed and the time at which the element may be displayed. Due to numerous differences between presentation platforms, such as set top boxes, satellite receivers, computers, or interactive televisions, for example, content providers have historically been required to select a specific platform in the development of an enhancement application. In order to provide support for each additional platform, the interactive content provider must introduce potentially significant modifications to the existing application, resulting in the ongoing maintenance of multiple code bases, and adding to the time and cost required producing enhanced page layouts for multiple platforms.

Additionally, previous methods employed to enter parameters required to generate and position the elements comprising the layout of enhanced pages have involved significant manually entry. Manual editing of an enhancement file may also introduced unintended changes such that enhancements are not uniform across platforms. Therefore a new method of creating enhanced content that allows utilization across multiple platforms and provides an accurate preview of enhancements is needed.

SUMMARY OF THE INVENTION

The present invention overcomes the disadvantages and limitations of the prior art by providing a system and method that parses a text based script enhancement file to provide emulation of enhancements and to provide output of platform specific enhancement files. The enhancement file, which may employ an XML format, contains a description of enhancements including element position, attributes, triggering and linkage. Linkage associates a file with an element such that a user may select a linked object to access websites, launch other applications, or to perform other tasks. Parsing the enhancement file produces an output file targeted to a specific platform. The platform may comprise a set top box, interactive television or computer display. A file parsed for computer display may be employed for emulation and preview of enhancements and may contain functions for control of a browser media player.

The invention therefore may comprise a method for creating a television presentation enhancement comprising accessing a platform independent enhancement file containing elements and attributes of the elements, applying a first parsing script to the enhancement file to produce a first output file that may be viewed using a web browser and media player, and applying a second parsing script to the enhancement file to produce a second output file that may be viewed with a set top box.

An enhancement file of XML format may be parsed using XSL (Extensible Stylesheet Language) scripts. In the present invention, an XML file with tags for administrative information, layout information, and trigger information is employed. The XML file may be parsed to produce an output file containing HTML and JavaScript code wherein the version of HTML and Javascript reflect the level of support provided by the target platform. Further, the output file may be formatted for a mode of enhancement transport. In a first mode of transport, enhancements and triggers are supplied in conjunction with a video program. In a second transport mode, triggers and a locator, such as a URL, are provided in conjunction with a video program and the platform employs the locator to access enhancement information.

The invention may further comprise a system for developing television enhancements comprising a computer; a database; a web browser; and a parser operable to parse a platform independent enhancement file contained in the database and to produce an output that may be viewed employing the browser.

Advantageously, the invention provides viewing and emulation of enhancement files employing a personal computer or similar equipment. This allows a team of developers and reviewers to be physically separated, and allows enhancement customers (such as advertisers) to preview material by simply accessing a website.

DESCRIPTION OF THE FIGURES

In the figures.

DETAILED DESCRIPTION OF THE INVENTION

Enhanced television content is typically presented using a combination of HTML, JavaScript, Java and other web technologies. The level of support for these technologies varies by the targeted presentation platform, including the combination of client hardware, operating system, web browser and add-on software. A presentation platform comprises a set top box, interactive television, computer, or other system operable to receive television signals and to process HTML and other code and to produce a display comprising a television image and enhancements. Capabilities vary depending the specific platform. Certain functions may or may not exist, or may be optimized on a given platform through the use of custom features. Variants include screen size and resolution, acceptable color combinations, graphics support, and version of HTML or JavaScript, for example. Providing concurrent support for the Internet or wireless handheld devices introduces additional requirements and dependencies. The present invention overcomes the difficulties of supporting multiple platforms, each having a specific set of capabilities, by employing a platform independent text based script file that completely defines the enhancement assets, their location and other attributes, as well as the triggering information. The text based script file is then translated by parsing software to produce platform dependent files comprising HTML and JavaScript code tailored to the specific platform. The present invention also allows translation targeting a web browser and a media player, providing emulation and preview of authored enhancements.

Figure 1:
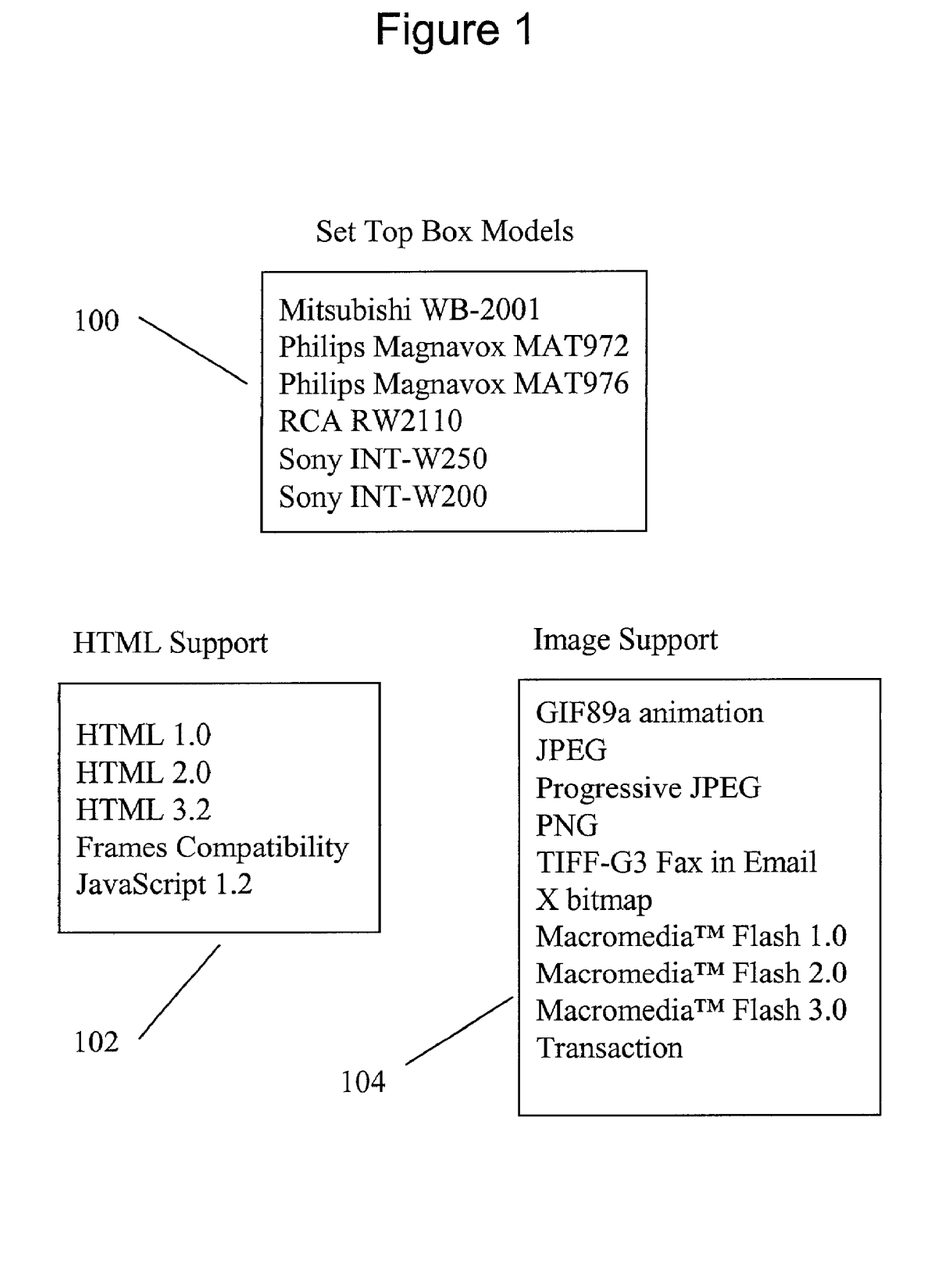
FIG. 1 depicts html and image support for a group of commercially available set top box products.

FIG. 1 depicts HTML and image support for a group of commercially available set top box products. Set top box models 100 provide HTML support 102 and image support 104. HTML support 102 lists support for html 1,0, 2.0, and 3.2 versions. A limitation of HTML is that some versions lack downward compatibility. For example, HTML versions 4 and higher do not support all the tags of HTML 3.2. FIG. 1 serves to illustrate that an HTML based author for creating enhanced content would not be able to support a wide range of target platforms. The present invention overcomes the disadvantages of HTML based authoring by employing an authoring tool that generates an XML file that may be parsed using XSL scripts for each platform type to produce HTML code and JavaScript suitable for each platform.

Figure 2:
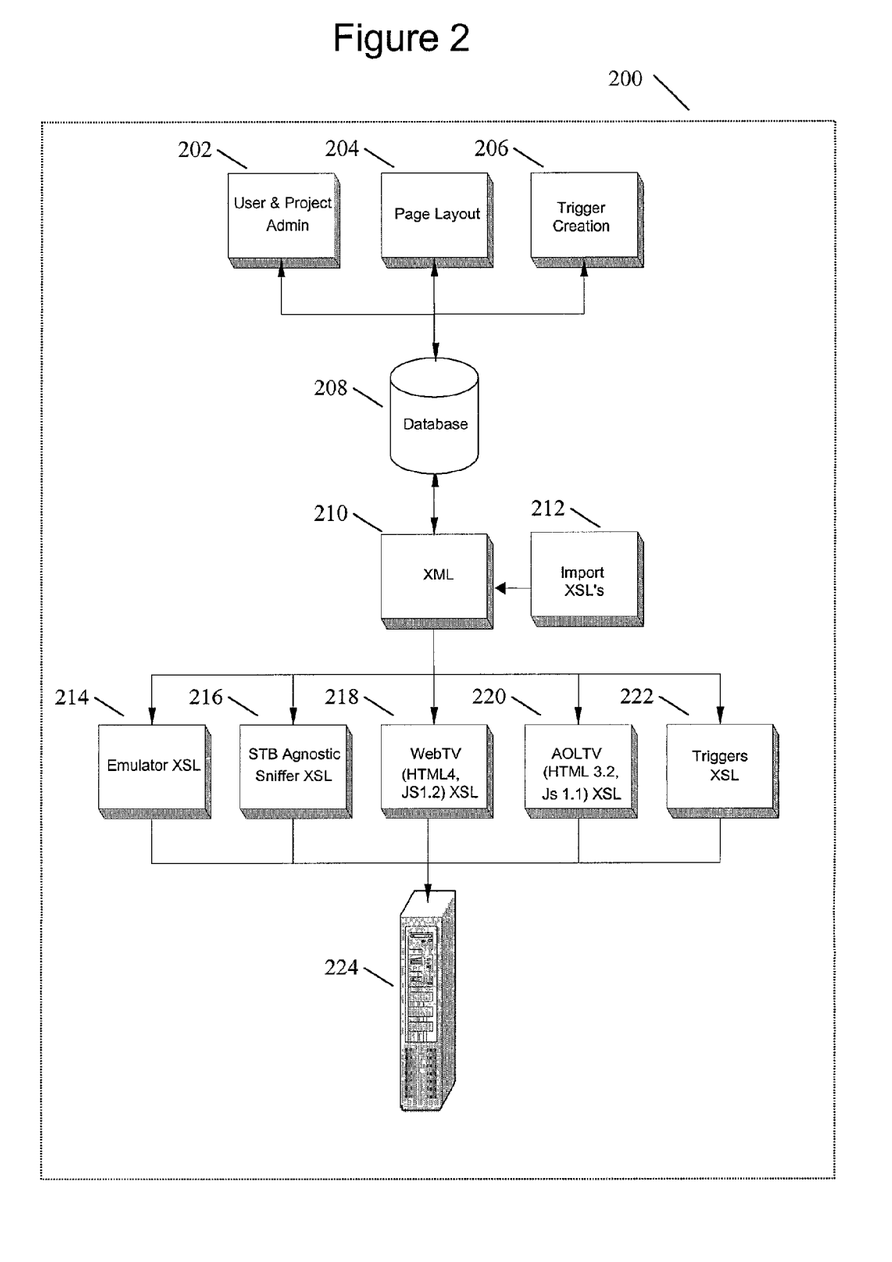
FIG. 2 depicts the software environment of the present invention.

FIG. 2 depicts the environment of the present invention. Environment 200 comprises database 208 containing user and project administration information 202, page layout information 204 and trigger creation information 206. XML file 210 is created using information from database 208. Import XSL's 212 may be employed to translate HTML and JavaScript into XML file 210. Emulator XSL 214 provides translation of XML file 210 into HTML and JavaScript, plus provides media player controls for emulation and preview. STB Agnostic Sniffer XSL 216 includes platform query routines to determine the type of platform requesting enhancement information. WebTV™ XSL 218 provides translation compatible with WebTV platforms. AOLTV™ XSL 220 provides translation compatible with AOLTV platforms. Triggers XSL 222 provides triggers that may be transmitted with a television presentation that may be used to synchronize display of enhancements. Enhancement information may be transmitted with the television presentation, or may be accessed by the platform in response to the trigger information. Translated files may be stored in server 224.

Figure 3:
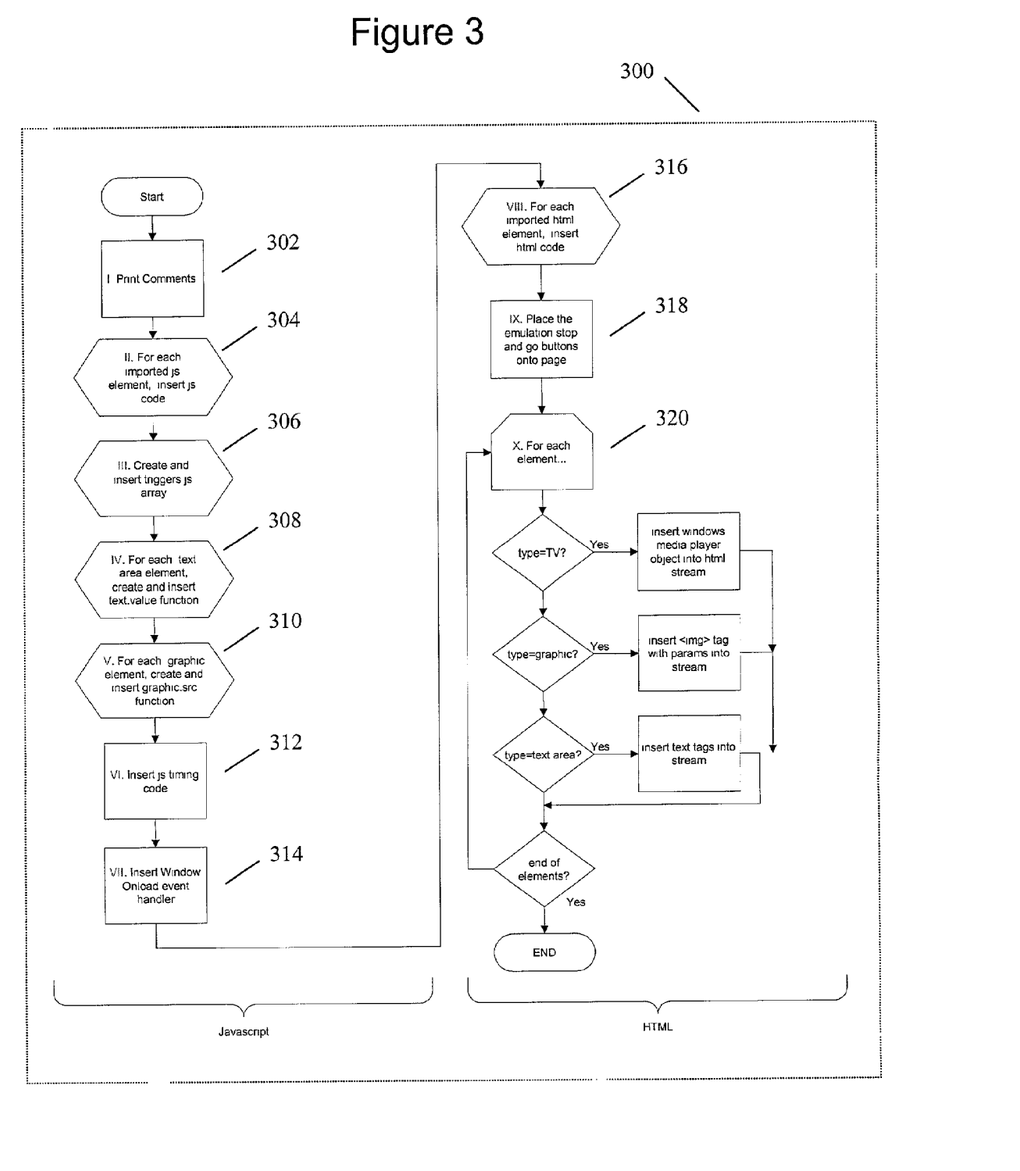
FIG. 3 is an overview flowchart of parsing an XML file to emulate and preview enhancements.

FIG. 3 is an overview flowchart of parsing an XML file to emulate and preview enhancements. Process steps shown in FIG. 3 are described in greater detail in following figures. Parsing process 300 starts with step 302 where comments are inserted that indicate the project name, page names, date, time, and other information. This information will form in part, the header of the resultant HTML/JavaScript file produced by the parsing process. At step 304, a list of elements comprising an enhancement is scanned and checked for a JavaScript tag. If a JavaScript tag is found, the JavaScript is placed into the output file. At step 306, trigger tags are extracted, trigger data is sorted and a JavaScript trigger array is created that comprises time, element, and new element value. This array is referenced during emulation. At step 308, the list of elements is scanned and a function to change the text value is generated for elements with a text area tag. This function allows text in a text area to be changed, such as response to a trigger event. At step 310, the list of elements is scanned and a function to change the source value is applied to graphics elements. At step 312, code that references the trigger array and individual function is inserted. At step 314, code is inserted that is executed when the browser window is opened. At step 316, the list of elements is scanned and if an imported HTML tag element is found, the value is extracted and placed in the output file. At step 318, code supporting a media player including stop, go, pause, and timer is written to the output file. At step 320, a media player object is placed in the output file if a 'TV' object is present in the XML source file. Graphics elements are placed in the output file with 'img' tags and text elements are placed in the output file with text tags. A web browser may access the output file created by the above parsing process and the enhancement may be displayed. If the enhancements are related to a television image, the media player module allows viewing in conjunction with display of a video image. The module allows the media player to present a video sequence, along with enhancements. The media player may be paused, stopped, started, or the user may go to a specific frame or display time. The following figures provide a more detailed description of the steps employed in parsing an XML source file.

Figure 4:
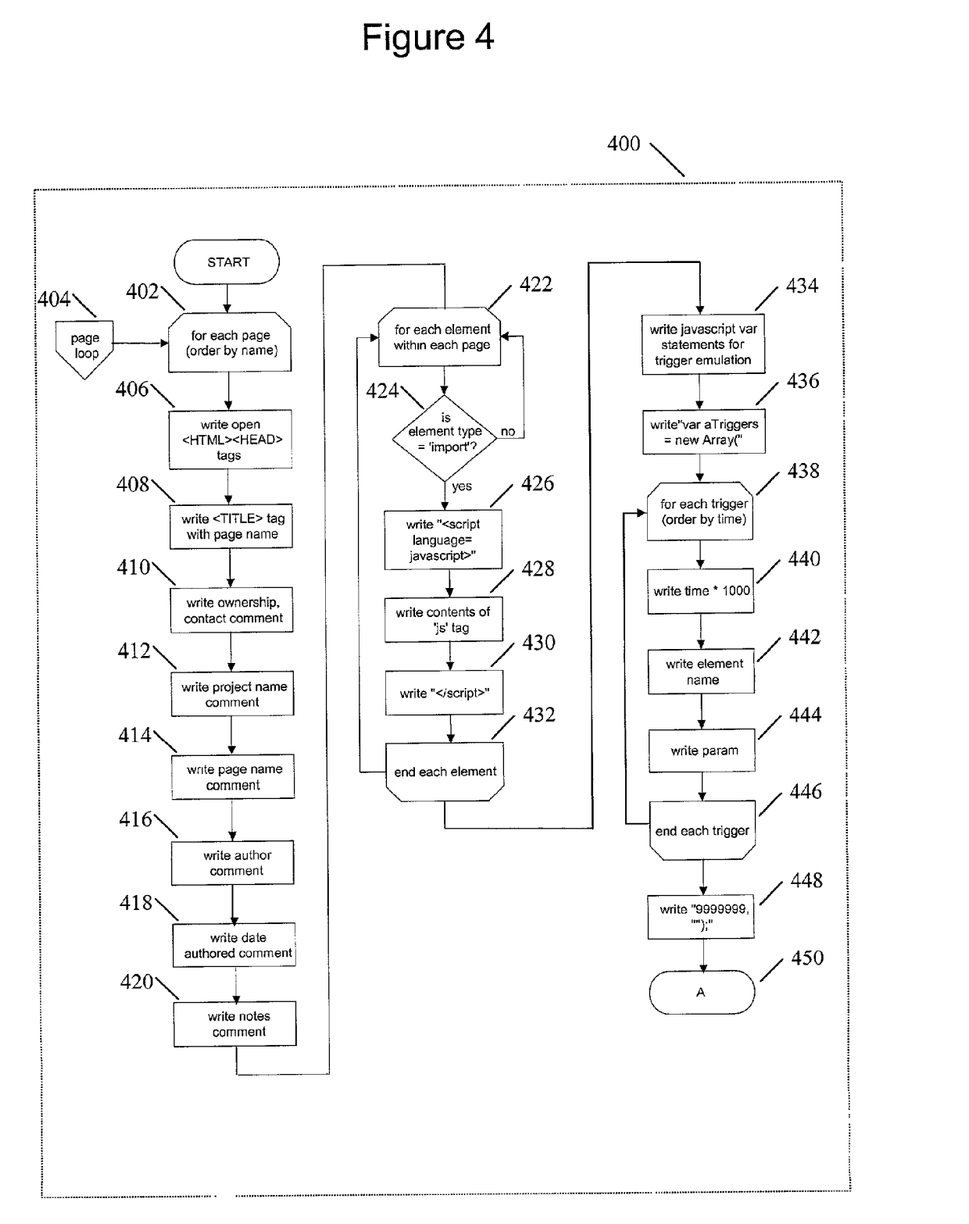
FIG. 4 depicts a first flowchart of part of a parsing process.

FIG. 4 depicts a first flowchart of part of a parsing process. Process 400 starts at step 402 where a looped process for each page of the XML file begins. Page loop 404 provides a return path for the process when an additional page or pages remain. At step 406,<HTML> and <HEAD> open tags are written. At step 408 a <TITLE> tag is written with the page name. At step 410, ownership and contact comment information may be written. At step 412, a project name comment may be written. At step 414, a page name comment may be written. At step 416, an author comment may be written. At step 418, a comment indicating the date the XML file was authored may be written. At step 420, a notes comment may be written. At step 422 a JavaScript tagging process begins. At step 424, an element is accessed from the XML file and is checked to determine if the element is of import type. If the element is not of import type, processing returns to step 422 where another element is accessed. If all elements have been accessed, processing continues at step 434. If the result of step 424 is that the accessed element is of import type, step 426 writes a language specification indicating that the script language is JavaScript. At step 428, the contents within the 'js' tag of the XML file are written. At step 430, a "</script>" closing tag is written. At step 432, processing continues to step 422 to access additional elements. If all elements have been accessed, processing continues at step 434. At step 434 JavaScript variable statements for trigger emulation are written. At step 436, an opening tag for an array of triggers is written. At step 438 a processing loop is started. Step 438 accesses trigger information, ordered by time, each time the loop is executed. At step 440, the trigger time, multiplied by 1000, is written. At step 442, the element name affected by the trigger is written. At step 444, parameters associated with each trigger are written. Step 446 checks if additional trigger information may be accessed for the current page. If additional information may be accessed, processing continues at step 438. When all trigger information has been accessed, processing continues at step 448 where a value indicating the end of the trigger array is written. Step 450 leads to the steps shown in FIG. 5.

Figure 5:
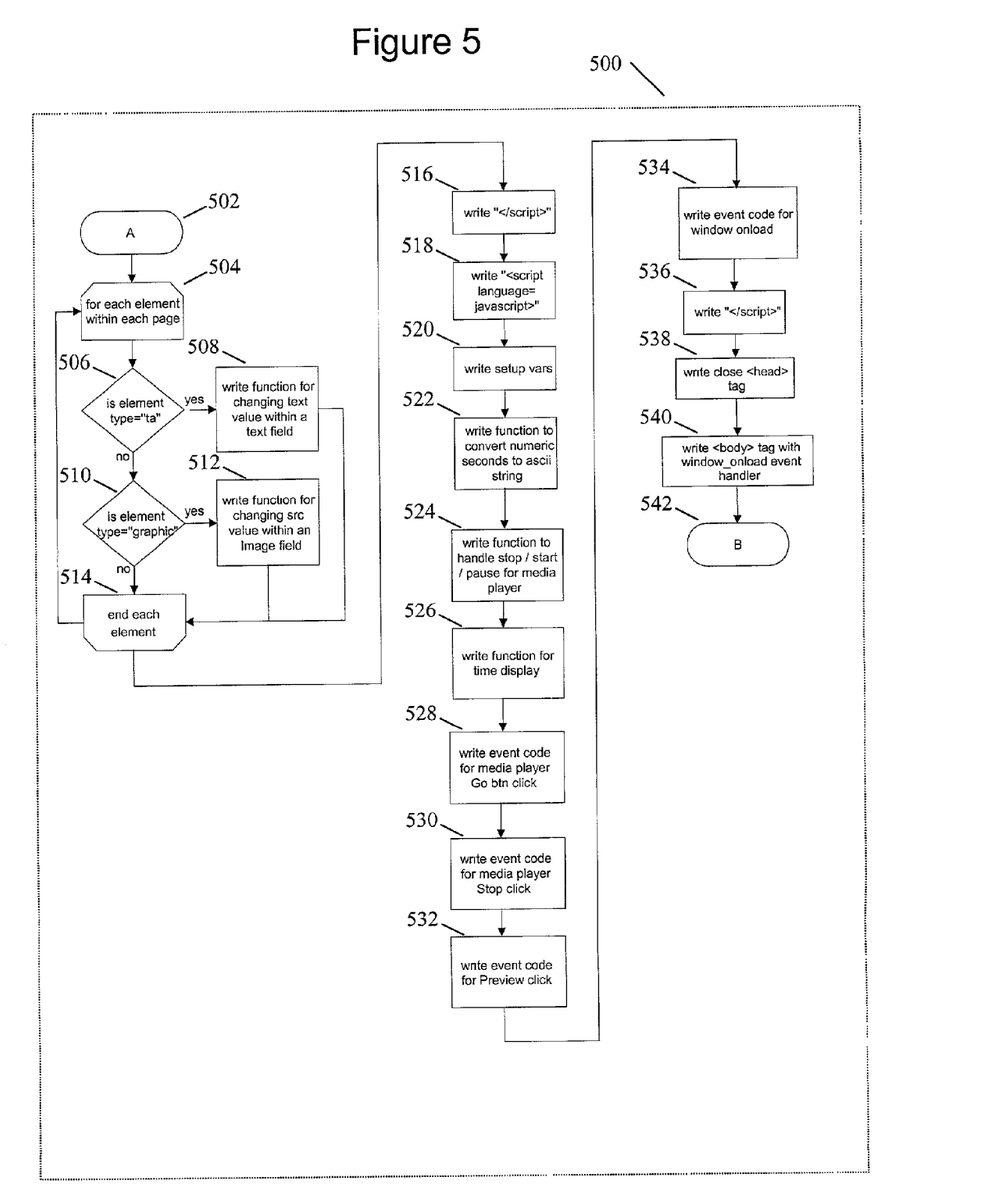
FIG. 5 depicts a second flowchart of a parsing process.

FIG. 5 depicts a second flowchart of a parsing process. Step 502 is a continuation from the steps shown in FIG. 4. At step 504, a processing loop accesses each element of the current page. Step 506 checks if the element is a text element. If the element is a text element, step 508 writes a function for changing the text value within the text area. Processing then continues with step 514. If step 506 determines that the element is not a text element, step 510 checks if the element is a graphics element. If the element is a graphics element, step 512 writes a function for changing the source value within an image field. Processing then continues with step 514. If step 510 determines that the element is not a graphic element, processing continues at step 514. At step 514, processing continues at step 504 if additional elements remain. If all elements have been accessed, processing continues at step 516. Step 516 writes a script closing tag. Step 518 then writes a script language tag indicating that the script language is JavaScript. Step 520 writes setup variables for a media player. Step 522 then converts numeric seconds to an ASCII string. Step 524 writes a function to handle start, stop and pause controls for the media player. Step 526 writes a function for time display. Time display may be used to indicate the time of a video sequence being shown by the media player. At step 528, event code for selection of the media player 'go' button is written. At step 530, event code the selection of the media player 'stop' button is written. At step 532, event code for selection of the media player 'preview' button is written. At step 534, event code is written that is executed when the emulation window is opened. At step 536 a closing script tag is written. At step 538 a closing head tag is written. Step 540 writes a 'body' tag with an event handler for window loading. Step 542 leads to the steps shown in FIG. 6.

Figure 6:
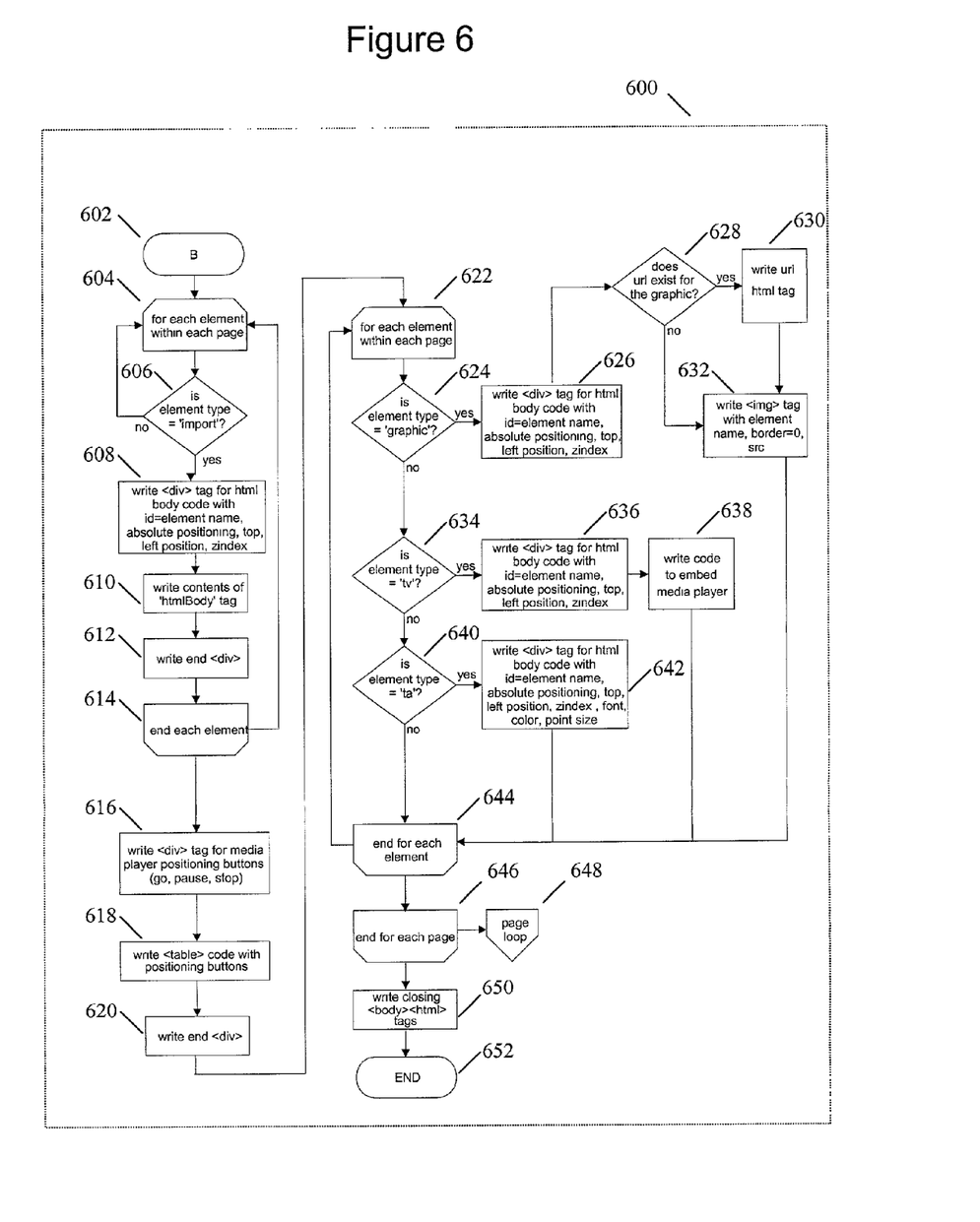
FIG. 6 depicts a third flowchart of a parsing process.

FIG. 6 depicts a third flowchart of a parsing process. Step 602 is a continuation from the steps shown in FIG. 5. At step 604, a processing loop accesses each element within each page. Step 606 checks if the element is of import type. If the element is not of import type, processing continues at step 604 where the next element is accessed. If all elements have been accessed, processing continues at step 616. If step 606 determines that the element is of import type, step 608 writes a division tag (<div>) and writes body code comprising element name, absolute position, top left position and z index. The z index value may be employed to control the order in which elements are rendered, causing one element to appear on top of another element. Step 610 writes the contents of the 'htmlbody' tag. Step 612 then writes an end <div> tag. At step 614, if all elements have not been accessed, processing continues at step 604. If all elements have been accessed, processing continues at step 616. Step 616 writes a division tag for media player positioning buttons. Step 618 writes <table> code with positioning buttons. Step 620 writes an end <div> tag, demarking the division started at step 616. At step 622, a processing loop accesses each element within each page. Step 624 checks if the element type is graphic. If the element is a graphic element, step 626 writes a division tag for html body code comprising element name, absolute position, top left position and z index. Step 628 checks if a URL (Universal Resource Locator) exists for the element. If a URL exists, step 630 writes a URL html tag. Step 632 then writes an 'img' tag with element name, border=0, and source. Source is the address of where the graphic element is stored. Processing then continues at step 644. If step 628 determines that a URL does not exist for the element, step 632 writes an 'img' tag with element name, border=0, and source. Processing then continues at step 644. If step 624 determines that the element is not a graphics element, processing continues at step 634. Step 634 checks if the element is of type 'tv'. If the element is of type 'tv', step 636 writes a division tag for html body code comprising element name, absolute positioning, top left position, and z index. Step 638 writes code to embed a media player. Processing then continues at step644. If step 634 determines that the element is not a 'tv' type element, processing continues to step 640 where a check is performed if the element is a text area element. If the element is a text area element, step 642 writes a division tag for html body code comprising element name, absolute positioning, top left position, z index, font, color, and point size. Processing then continues at step 644. If step 640 determines that the element is not a text area element, processing continues at step 644. At step 644 processing loops back to step 622 if elements remain that have not been accessed. Otherwise, processing continues at step 646. If pages remain that have not been accessed, processing continues to step 648 where the process loops back to step 404 of FIG. 4 to access the next page. If all pages have been accessed, step 650 writes closing <body> <html> tags and the process ends at step 652.

Figure 7:
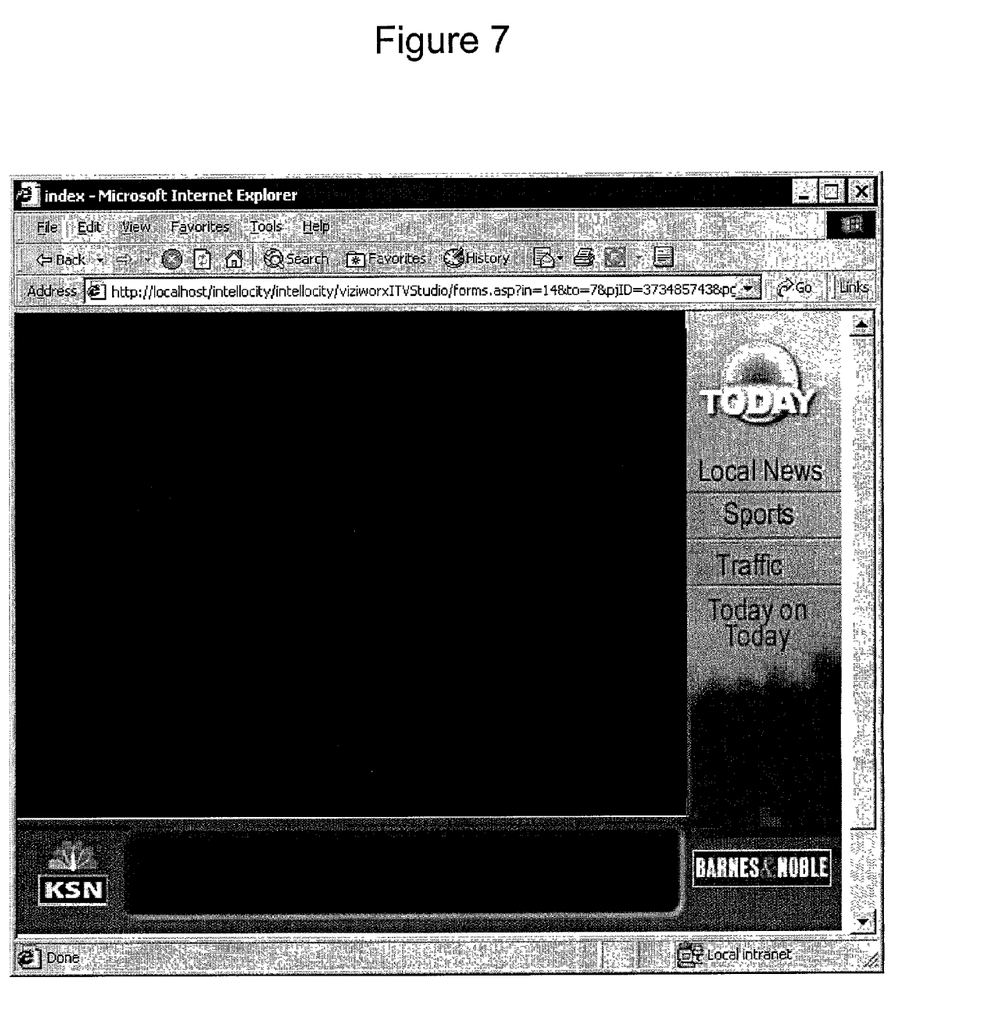
FIG. 7 depicts a computer display of an enhancement.

FIG. 7 depicts a computer display of an enhancement. A text based script file, employing an XML format, describing the elements employed to create the enhancement depicted in FIG. 7 is listed in Appendix A. Appendix B lists an HTML file with JavaScript that has been produced from the code of Appendix A through the process described in FIGS. 3 to 6. Appendix B includes section identifiers that relate the code sections to steps shown in FIG. 3.

In operation, a user logs into an editing system, creates a project, and then lays out enhanced content pages and creates triggers for those pages. A database stores project information that comprises pages and triggers and may include project name, author date and other information. Information in the database is employed to create a text based script file that describes each element, its attributes, its layout and triggering of the element. In one embodiment of the present invention, an XML file is employed. This file is output platform independent and completely defines the assets, their location and other attributes, as well as the triggering information necessary for the enhanced content project. The XML file is then processed using one or more XSL rule based parsers that "translate" the XML file into another format, such as HTML 4.0 and Javascript 1.2, for example. As depicted in FIG. 2, XSL parsers are employed for emulation and for creating platform specific output files. Parsing of the enhancement file for a particular platform may include translation of color values. Some platforms do not display pure colors and as such a lookup table or translation algorithm may be employed to check a color value and to alter the color value. The process shown in FIGS. 3 to 6 produces an HTML and Javascript output that may be run on an industry standard web browser and media player such as Microsoft Internet Explorer and Windows Media Player, both from Microsoft Corporation. Additional information regarding XSL may be obtained from the following books:

Title: Professional XSL
Authors: Kurt Cagle et al.
Publisher: Wrox Press Inc;
ISBN: 1861003579
Title: XSL Companion, The
Author: Neil Bradley
Publisher: Addison-Wesley Pub Co;
ISBN: 0201674874

The foregoing description provides a system and method that translates a platform independent enhancement file into platform dependent files without needing to change the authored enhancements, saving time and money and providing a uniformity of enhancement across multiple platforms. The steps shown in the figures need not be performed in the exact order shown. An XML file format has been employed in the described embodiment. Other formats, both public and proprietary, may be employed to describe enhancements and attributes of the elements comprising enhancements. Enhancement output files allow enhancement of a television broadcast that may employ various methods of delivering enhancement data. A first method transfers enhancement data as part of the broadcast. A second method transfers a trigger and locator with the broadcast, and the set top box, or other platform, employs the locator to access enhancement information. The second method of transfer may further comprise receiving information identifying the type of platform requesting enhancement data (when the platform accesses the locator), and providing enhancement information suited to the requesting platform. A new or modified parser may be employed to support new platforms, or new versions of platforms. The new or modified parser then may be applied to a plurality of source enhancement files that need not be modified. In this manner, the present invention provides costs savings in supporting new platforms or new versions of platforms.

The foregoing description of the invention has been presented for purposes of illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of creating a television presentation enhancement comprising:
    accessing a platform independent enhancement file containing elements, attributes of said elements, and trigger information specifying at least one event wherein said enhancement is rendered in synchrony with at least one image of a video presentation;
    applying a first parsing script to said platform independent enhancement file to produce a first output file that provides rendering of said enhancement in synchrony with said at least one image in a web browser having an embedded media player; and
    applying a second parsing script to said platform independent enhancement file to produce a second output file that provides rendering of said enhancement in synchrony with said at least one image on a specific television platform.

2. The method of claim 1 wherein said platform independent enhancement file further comprises:
    XML compliant tags for elements, triggers, and administrative information comprising enhancement file name and enhancement file creation date.

3. The method of claim 1 wherein said platform independent enhancement file is a text file.

4. The method of claim 1 further comprising:
    displaying said first output file in a browser window.

5. The method of claim 1 wherein said step of applying a second parsing script further comprises:
    specifying aversion of HTML for said second output file.

6. The method of claim 1 wherein a link is associated with at least one of said elements.

7. The method of claim 1 wherein said attributes of said elements further comprises:
    a z order value for at least one of said elements.

8. The method of claim 1 wherein said first parsing script is an XSL transformation file.

9. The method of claim 1 wherein said second parsing script is an XSL transformation file.

10. The method of claim 1 wherein said platform independent enhancement file contains a change text function.

11. The method of claim 1 wherein said second parsing script imports HTML code into said second output file.

12. The method of claim 1 wherein accessing said enhancement file further comprises:
    accessing a database containing user and project administration information, page layout information and trigger creation information.

13. The method of claim 1 wherein said second parsing script is operable to translate a color value.

14. The method of claim 1 further comprising:
    editing said platform independent enhancement file to specify elements and attributes of said elements.

15. The method of claim 1 wherein said first parsing script includes a routine tat scans a list of elements and produces a change text function for elements with a text area tag.

16. The method of claim 1 wherein said second parsing script includes a function to translate a color value dependent on said specific television platform.

17. A computer readable medium comprising a parser for producing a platform specific television enhancement file the parser comprising:
- a function that accesses a platform independent file containing project information, a description of an element, the position of said element, and a time at which said element may be rendered;
- a function that creates an HTML header containing said project information;
- a function tat places said position of said element between division tags in an HTML output file if said element is either a text element or a graphic element;
- a function that inserts JavaScript code if said element is an imported element;
- a function tat embeds a media player in an HTML file if said element is a television element;
- a function that updates an address at which said element may be accessed; and
- a function tat creates and stores triggers in a JavaScript array.

18. The computer readable medium of claim 17 wherein said parser is XSL compliant.

19. The computer readable medium of claim 17 further comprising:
- a function tat imports HTML code.

20. The computer readable medium of claim 17 further comprising:
- a function to translate color value.

21. The parser of claim 17 further comprising:
- a routine that scans a list of elements and produces a change text function for elements with a text area tag.

22. The parser of claim 17 further comprising;
- a routine tat translates a color value dependent on a specific television platform.

23. A method of producing a television enhancement comprising:
- accessing a database containing a platform independent enhancement file comprising elements, attributes of said elements, and trigger information specifying at least one event when said enhancement is rendered in synchrony with a video presentation;
- selecting a first parsing program from a plurality of parsing programs each parsing program supporting a specific platform;
- parsing said platform independent enhancement file using said first parsing program to produce a first output file that may be viewed with a web browser;
- saving said first output file;
- selecting a second parsing program from the plurality of parsing programs;
- parsing said platform independent enhancement file using said second parsing program to produce a second output file that may be viewed with employing a specific television platform; and
- saving said second output file.

24. The method of claim 23 wherein said platform independent enhancement file is XML compliant.

25. The method of claim 23 wherein said parsing said platform independent enhancement file using said first parsing program further comprises:
- applying an XSL transformation to said platform independent enhancement file.

26. The method of claim 23 wherein said parsing said platform independent enhancement tile using said first parsing program further comprises:
- translating a color value associated with one of said elements.

27. A system for developing television enhancements comprising:
- a computer
- a database;
- a web browser;
- a first parser that parses a platform independent enhancement file contained in said database and that produces an output that may be viewed employing said browser; and
- a second parser that parses said platform independent enhancement file contained in said database and that produces an output that may be viewed employing a specific television platform,
- wherein said platform independent enhancement file comprises elements, attributes of said elements, and trigger information specifying at least one event when said outputs are rendered in synchrony with a video presentation.

28. The system of claim 27 further comprising:
- a component that embeds a media player in said browser if said platform independent enhancement tile contains an element representative of a television image.

29. The parser of claim 28 wherein said platform independent enhancement file further comprises:
- an element that specifies a screen location for the media player.

30. The system of claim 27 wherein said parser scans a list of elements and produces a change text function for elements with a text area tag.

* * * * *